United States Patent [19]

Takahashi et al.

[11] Patent Number: 6,162,120
[45] Date of Patent: Dec. 19, 2000

[54] COMPETITIVE VIDEO GAME APPARATUS, METHOD OF PLAYING VIDEO GAME, AND COMPUTER-READABLE RECORDING MEDIUM

[75] Inventors: Kazuya Takahashi; Hiroki Honda, both of Kobe, Japan

[73] Assignee: Konami Co., Ltd., Hyogo-ken, Japan

[21] Appl. No.: 09/096,052

[22] Filed: Jun. 11, 1998

[30] Foreign Application Priority Data

Jun. 16, 1997 [JP] Japan .................................... 9-159066

[51] Int. Cl.$^7$ ............................ A63F 13/00; G05B 13/02
[52] U.S. Cl. .................................. 463/8; 463/23; 700/47
[58] Field of Search ................................ 463/14, 23, 43, 463/44, 36–38, 7–8; 273/459, 460–461, 260, 148 B; 700/28, 47; 706/62, 927; 707/1, 3–6

[56] References Cited

U.S. PATENT DOCUMENTS

| | | |
|---|---|---|
| 5,616,078 | 4/1997 | Oh . |
| 5,649,862 | 7/1997 | Sakaguchi et al. ........................ 463/44 |
| 5,683,082 | 11/1997 | Takemoto et al. ......................... 463/23 |
| 5,720,663 | 2/1998 | Nakatani et al. ........................... 463/23 |
| 5,800,265 | 9/1998 | Yamazaki et al. ......................... 463/23 |
| 5,805,784 | 9/1998 | Crawford ................................... 463/23 |
| 5,984,786 | 11/1999 | Ehrman ..................................... 463/42 |

FOREIGN PATENT DOCUMENTS

| | | |
|---|---|---|
| 0655265 A1 | 2/1994 | European Pat. Off. .......... A63F 9/22 |
| 655265 | 5/1995 | European Pat. Off. . |

OTHER PUBLICATIONS

"Parallel Move Generation System for Computer Chess", EIECE Trans INF & Syst.. vol. E79–D, No. 4, all pages, Apr. 1996.

"Deep Blue: Computer Chess and Massively Parallel System", C. J. Tan, all pages, Jul. 1995.

Tan C J: "Deep Blue: Computer Chess and Massively Parallel Systems (Extended Abstract)" Proceedings of the International Conference on Supercomputing, Barcelona, Jul. 3–7, 1995, Jul. 3, 1995 pp.237–239, XP000546286, Association for Computing Machinery.

Yi–Fan Ke et al: "Parallel Move Generation System for Computer Chess" IEICE Transactions on Information and Systems, vol. E79–D, No. 4, Apr. 1, 1996, pp. 290–296, XP000592758.

*Primary Examiner*—Peter Vo
*Assistant Examiner*—John Paradiso
*Attorney, Agent, or Firm*—Jordan & Hamburg LLP

[57] ABSTRACT

A control system registers effective combat actions of competitive characters in a RAM and learns the effective combat actions of the competitive characters. The control system also selects one of the combat actions stored in the RAM depending on the combat situation, and controls a CPU character to perform the selected combat action on a display screen. The CPU character learns and uses combat action information at the manual control level of the game player. Since the combating level of the CPU character is made substantially the same as the manual control level of the game player, the game player finds it enjoyable to play a combat game without getting bored.

6 Claims, 9 Drawing Sheets

FIG. 6

CHARACTER 0    SITUATION 0    pt 0

|     | FRM | PTS | SEQUENCE |
|-----|-----|-----|----------|
| 0.  | 66  | 37  | G__^66P.PP |
| 1.  | 56  | 34  | G_3+KKKK |
| 2.  | 50  | 20  | G_^~P636 |
| 3.  | 48  | 10  | G^~P63 |
| 4.  | 56  | 10  | G+P~66.G+PG+P |
| 5.  | 13  | 9   | 6+P+K |
| 6.  | 54  | 8   | G^~~6P |
| 7.  | 52  | 8   | 2+G__^2+P |
| 8.  | 23  | 8   | 123+P6 |
| 9.  | 65  | 7   | G__^2_KK |
| 10. | 45  | 4   | G_63P |
| 11. | 10  | 2   | 4+P+K |
| 12. | 17  | 1   | 666K |
| 13. | 20  | 1   | PKP+KP+K |
| 14. | 37  | 1   | P6366+P36 |
| 15. | 16  | -3  | 6K.KK |
| 16. | 41  | -3  | G__^2 |
| 17. | 15  | -4  | 33P2 |
| 18. | 5   | -5  | K6 |
| 19. | 46  | -5  | PPPPPP |
| 20. | 17  | -5  | 3+PP |

COMPETITIVE VIDEO GAME APPARATUS, METHOD OF PLAYING VIDEO GAME, AND COMPUTER-READABLE RECORDING MEDIUM

BACKGROUND OF THE INVENTION

1. Field of the Invention:

The present invention relates to a competitive video game apparatus for playing a competitive video game, such as a combat game or a sports game, displayed on a display screen for a competitive match between two contestants or competitive characters which include at least one of a player character and a CPU (Central Processing Unit) character, a method of playing such a competitive video game, and a computer-readable recording medium which stores a control program for such a competitive video game.

2. Description of the Prior Art:

Competitive video game systems play a competitive video game, such as a combat game or a sports game, displayed on a display screen for a competitive match between a player character that is manually controlled by the game player and a CPU character that is controlled by a video game system controller including a CPU based on a control program and control data.

When a combat game, for example, is played on a competitive video game system between a player character and a CPU character, the game player manually controls the player character with a manual controller in efforts to attack the CPU character on the display screen. The combat game is finished if the player character is damaged beyond a predetermined degree by kicks and punches from the CPU character or the game player fails to damage the CPU character beyond a predetermined degree within a given period of time.

If the combating level of the CPU character is much higher than the manual control level of the game player, then the player character controlled by the game player tends to lose quickly, making the game player lose interest in the combat game. On the other hand, if the combating level of the CPU character is much lower than the manual control level of the game player, then the player character controlled by the game player tends to win easily without thrilling combat actions, making the game player feel uninterested in the combat game or causing the game player to continue the combat game too long for the competitive video game system to profit sufficiently per use.

If the combating level of the CPU character is almost the same as the manual control level of the game player, then the game player may control the player character to defeat the CPU character with highly thrilling combat actions, and hence may feel satisfied. In addition, the combat game will not continue too long, and the competitive video game system will provide sufficiently high profitability per use. However, since different game players have widely different manual control levels, it is impossible to equalize the combating level of the CPU character to the manual control levels of all game players who may come to play the competitive video game system.

One solution is to enable the game player to select one of certain combating levels for the CPU character depending on the manual control level of the game player. However, it is impracticable to prepare as many combating levels for the CPU character as the number of combating levels of possible game players. Even if sufficiently many combating levels were available for the CPU character, it would require the game player to become accustomed to the game system in order to select an appropriate combating level for the CPU character. Furthermore, if the manual control level of the game player is very high, then the game player is likely to win easily even when the game player has chosen a high combating level for the CPU character. At any rate, it is quite difficult to match up the combating level for the CPU character with the manual control level of the game player.

The CPU character is controlled by the video game system controller based on the control program and the control data. The video game system controller is programmed to control the CPU character to make attacking and guarding actions in certain predetermined patterns depending on how the combat game proceeds. Therefore, when the game player is well familiarized with the combat game, the game player is able to foresee a next attacking or guarding action or a combination of next attacking and guarding actions in each stage of the combat game. As a result, the experienced game player will be bored with the combat game, and eventually lose interest in the combat game.

SUMMARY OF THE INVENTION

It is therefore an object of the present invention to provide a competitive video game apparatus which is capable of matching up the competing level of a CPU character with the manual control level of a game player to allow the game player to enjoy a competitive video game without getting bored therewith.

Another object of the present invention is to provide a method of playing a competitive video game which can match up the competing level of a CPU character with the manual control level of a game player to allow the game player to enjoy a competitive video game without getting bored therewith.

Still another object of the present invention is to provide a computer-readable recording medium storing a competitive video game which can match up the competing level of a CPU character with the manual control level of a game player to allow the game player to enjoy a competitive video game without getting bored therewith.

According to an aspect of the present invention, there is provided a video game apparatus for playing a competitive video game on a display screen for a competitive match between competitive characters which include at least a player character and a CPU character. The video game apparatus includes controller means for manually controlling combat actions of the player character, storage means for storing combat actions of the CPU character corresponding to combat situations, player character control means for controlling the player character on the display screen in response to a control command from the controller means, and CPU character control means for storing effective combat actions of the competitive characters in the storage means and controlling the CPU character on the display screen to perform one of the combat actions stored in the storage means which is selected based on a present combat situation involving the player character and the CPU character. The CPU character control means may comprise competitive character operation extracting means for extracting operation of the competitive characters up to a time prior to the present time, situation information searching means for searching for the same situation information as situation information obtained from the operation extracted by the competitive character operation extracting means, combat action information learning means for registering, in the storage means, combat action information of the extracted operation corresponding to the same situation information searched for by the situation information searching means, and combat action information using means for controlling the CPU character on the display screen to perform one of the combat actions of the combat action information stored in the storage means which is selected based on a combat situation involving the player character and the CPU character.

According to another aspect of the present invention, there is provided a method of playing a competitive video game on a display screen for a competitive match between competitive characters which include at least a player character and a CPU character. The method comprises the steps of storing effective combat actions of the competitive characters, and controlling the CPU character on the display screen to perform one of the stored combat actions which is selected based on a present combat situation involving the player character and the CPU character. The step of controlling the CPU character may comprise the steps of extracting operation of the competitive characters up to a time prior to the present time, searching for the same situation information as situation information obtained from the operation which has been extracted, registering combat action information of the extracted operation corresponding to the same situation information which has been searched for, and controlling the CPU character on the display screen to perform one of the combat actions of the stored combat action information which is selected depending on a combat situation involving the player character and the CPU character.

According to still another aspect of the present invention, there is provided a computer-readable recording medium storing a control program for playing a competitive video game on a display screen for a competitive match between competitive characters which include at least a player character and a CPU character. The control program comprises the steps of storing effective combat actions of the competitive characters, and controlling the CPU character on the display screen to perform one of the stored combat actions which is selected based on a present combat situation involving the player character and the CPU character. The step of controlling the CPU character may comprise the steps of extracting operation of the competitive characters up to a time prior to the present time, searching for the same situation information as situation information obtained from the operation which has been extracted, registering combat action information of the extracted operation corresponding to the same situation information which has been searched for, and controlling the CPU character on the display screen to perform one of the combat actions of the stored combat action information which is selected based on a present combat situation involving the player character and the CPU character.

Inasmuch as the CPU character learns the combat action information of the manual control level of the game player, and uses the learned combat action information, the combating level of the CPU character is made substantially equal to the manual control level of the game player, and the game player can enjoy the combat game because the combating levels of the player and CPU characters are close to each other and the player and CPU characters fight against each other in a thrilling manner. Furthermore, since the CPU character learns a wide variety of unexpected attacking and guarding actions from various game players in the past and also learns the combat action information of the manual control level of the game player who is presently playing the combat game, the CPU character can deliver new combat actions at all times, and the game player can enjoy the combat game without getting bored. In addition, because the CPU character imitates combat actions of the player based on the present combat situation, the CPU character can fight in humanlike behaviors, which will make the game player enjoy the combat game much more.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 6 is a diagram showing a plurality of combat actions in one of the storage tables shown in FIG. 5;

DETAILED DESCRIPTION OF THE PREFERRED EMBODIMENT

A competitive video game apparatus according to the present invention is described as a combat video game apparatus for playing a combat video game for a competitive match between two contestants or competitive characters that are displayed. However, any of various different competitive video games such as a sports game may be played on the competitive video game apparatus.

Figure 1:
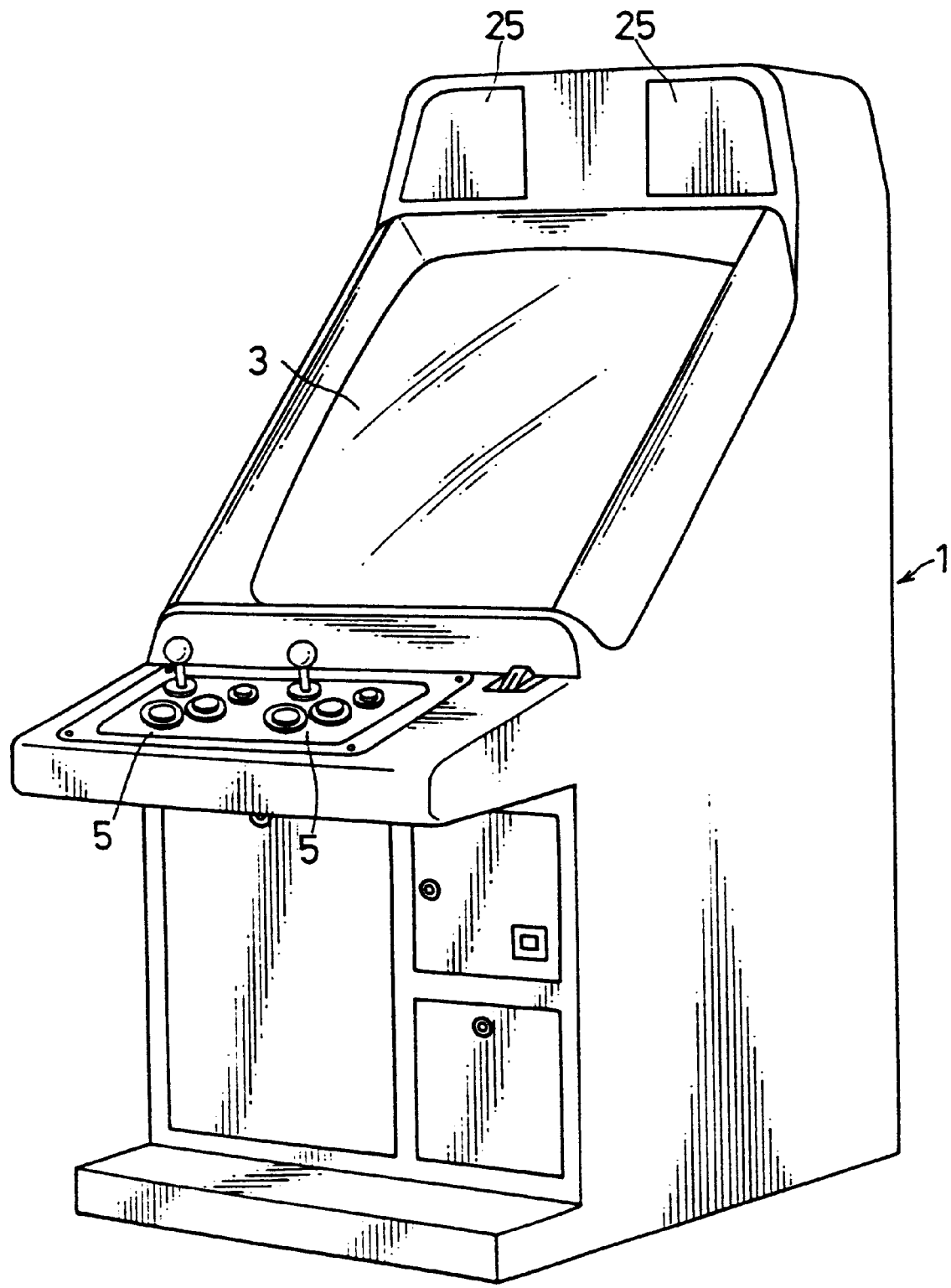
FIG. 1 is a perspective view of a competitive video game apparatus according to the present invention.
Figure 2:
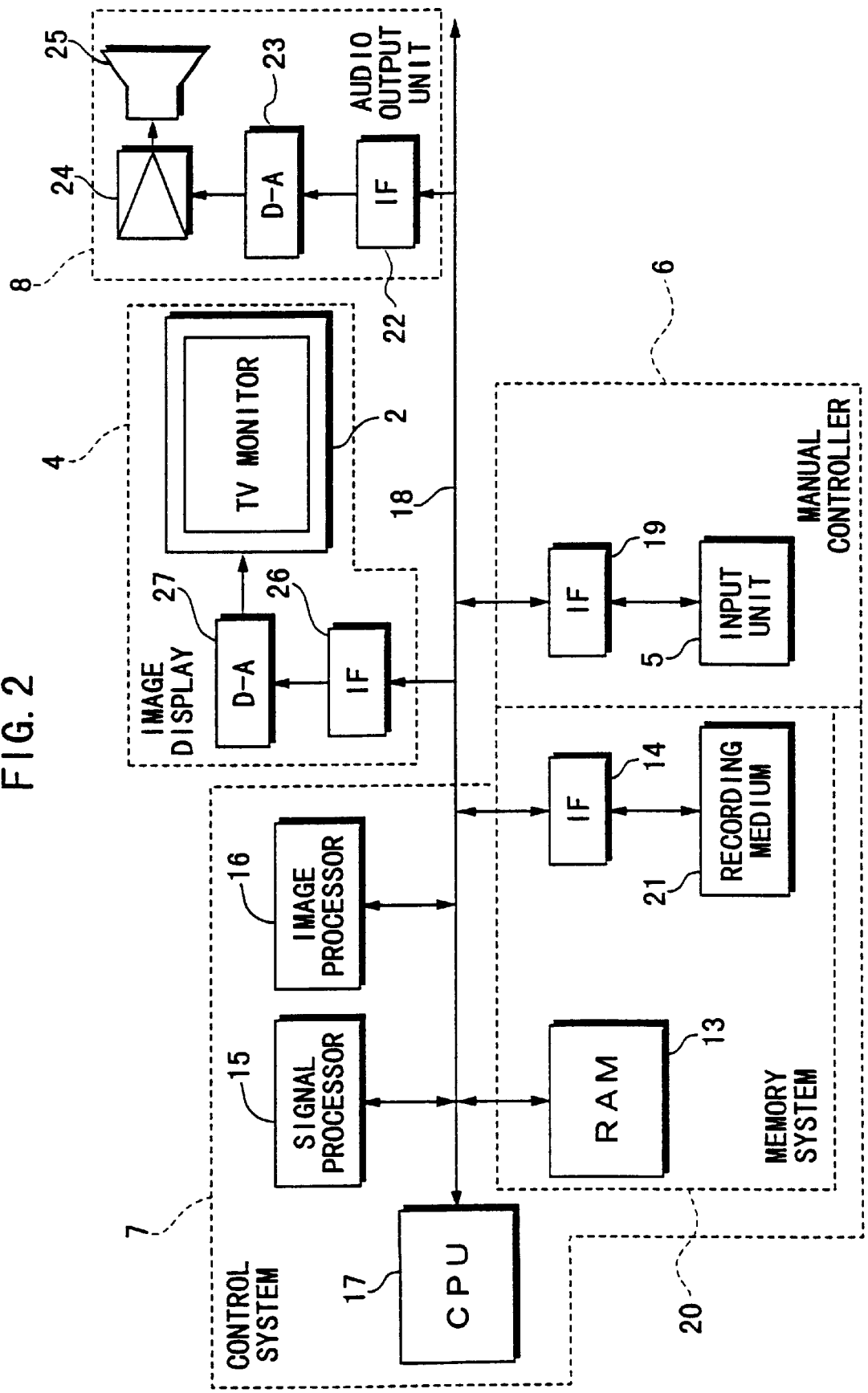
FIG. 2 is a block diagram of the competitive video game apparatus shown in FIG. 1.

As shown in FIGS. 1 and 2, a competitive video game apparatus 1 according to the present invention generally comprises an image display unit 4 disposed in an upper portion of an apparatus housing and having a projection display screen 3 for displaying game images projected from a television monitor 2, a manual controller 6 having a pair of input units 5 each manually operable by a game player for controlling a player character displayed on the projection display screen 3, a control-system 7 for executing commands depending on control signals from the manual controller 6, and an audio output unit 8 controlled by the control system 7 for producing audio output signals depending on game images displayed on the projection display screen 3.

Figure 3:
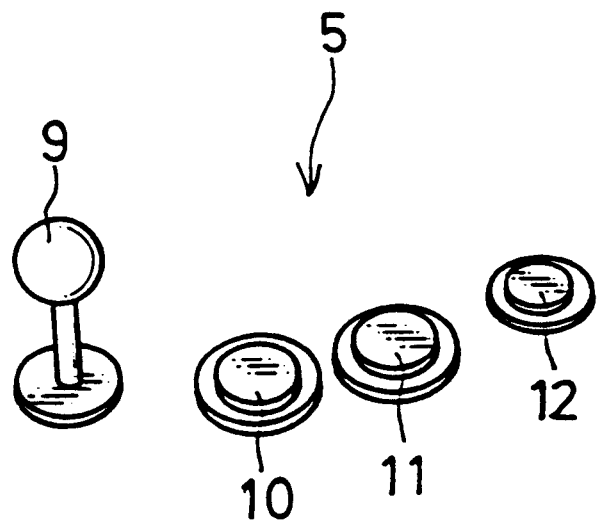
FIG. 3 is a perspective view of an input unit of the competitive video game apparatus shown in FIG. 1.

As shown in FIG. 3, each of the input units 5 comprises a joystick 9 movable in eight directions (see FIG. 4), a GUARD button 10 positioned near the joystick 9, for instructing the player character displayed on the projection display screen 3 to make a guarding action, a PUNCH button 11 positioned to the right of the GUARD button 10, for instructing the player character displayed on the projection display screen 3 to make a punching action, and a KICK button 12 positioned to the right of the PUNCH button 11, for instructing the player character displayed on the projection display screen 3 to make a kicking action. The input units 5 may be operated by two game players for controlling respective player characters displayed on the projection display screen 3 to fight against each other on the projection display screen 3, or one of the input units 5 may be operated by a single game player for controlling a player character displayed on the projection display screen 3 to fight against a CPU character which is also displayed on the projection display screen 3. When the input units 5 are not operated by any game players, two displayed CPU characters may fight against each other on the projection display screen 3 in a demonstration mode.

In each of the input units 5, the joystick 9 is used to control the direction of movement and also the direction of action of the player character displayed on the projection display screen 3. When the joystick 9 remains in a vertical direction (neutral position) as indicated by F5 in FIG. 4, the input unit 5 instructs the control system 7 to hold the player character in the present position, and the control system 7 controls the television monitor 2 to display the player character thus held on the projection display screen 3. When the joystick 9 is moved in a direction as indicated by F8 in FIG. 4, the input unit 5 instructs the control system 7 to cause the player character to jump toward an upper edge of the projection display screen 3, and the control system 7 controls the television monitor 2 to display the player character thus moved on the projection display screen 3. When the joystick 9 is moved in the direction as indicated by F8 in FIG. 4 and the PUNCH button 11 is also pressed, the input unit 5 instructs the control system 7 to cause the player character to jump and make a punching action, and the control system 7 controls the television monitor 2 to display the player character thus moved on the projection display screen 3. When the GUARDING button 10 and the PUNCH button 11 are simultaneously pressed, the input unit 5 instructs the control system 7 to cause the player character to make a throwing action, and the control system 7 controls the television monitor 2 to display the player character thus moved on the projection display screen 3. The buttons 10, 11, 12 may be pressed in various combinations to instruct the control system 7 to cause the player character to make various corresponding composite actions.

The control system 7 comprises a RAM 13 from and into which various data can be read and written, an interface 14, a signal processor 15, an image processor 16, and a central processing unit (CPU) 17 for controlling them. The RAM 13, the interface 14, the signal processor 15, the image processor 16, and the CPU 17 are interconnected by a bus 18 which comprises an address bus, a data bus, and a control bus. The input unit 5 of the manual controller 6 is connected via an interface 19 to the bus 18 for sending control signals via the bus 18 to the CPU 17, which executes various commands depending on supplied control signals.

A computer-readable recording medium 21 from and into which data can be read and written is connected to the interface 14. The RAM 13, the interface 14, and the recording medium 21 jointly make up a memory system 20. The recording medium 21 stores combat game data including image data, audio data, and combat game program data. The image data includes image data of combat actions, e.g., attacking actions, guarding actions, etc., depending on various positions of player and CPU characters, e.g., whether the player and CPU characters are spaced from each other, and whether one of the player and CPU characters is facing backward. The recording medium 21 may be a ROM cassette which comprises a ROM storing program data including the combat game data and an operating system and a plastic case housing the ROM, or an optical disk or a flexible disk.

The signal processor 15 mainly calculates two-dimensional positions of the competitive characters, generates audio data, and processes the calculated positions and the generated audio data. The image processor 16 writes image data to be displayed into the RAM 13 based on calculated results from the signal processor 15. The CPU 17 controls the signal processor 15 to process signals based on the image data, the audio data, and the program data stored in the recording medium 21, and also controls the image processor 16 to write image data and audio data into the RAM 13 based on the signals processed by the signal processor 15.

The audio output unit 8 comprises an interface 22 connected to the bus 18, a D/A converter 23 for converting a digital signal from the interface 22 into an analog audio signal, an integrated amplifier 24 for amplifying the audio signal outputted from the D/A converter 23, and a speaker 25 for radiating sounds based on the audio signal amplified by the integrated amplifier 24. When the audio data written into the RAM 13 by the image processor 16 is supplied through the interface 22, the D/A converter 23, and the integrated amplifier 24 to the speaker 25, sounds are outputted from the speaker 25 as the combat game progresses.

The image display unit 4 comprises an interface 26 connected to the bus 18, a D/A converter 27 for converting a digital signal from the interface 26 into an analog image signal, and a television monitor 2 for outputting images based on the image signal outputted from the D/A converter 27. When the image data written into the RAM 13 by the image processor 16 is supplied through the interface 26 and the D/A converter 27 to the television monitor 2, images of the player and CPU characters and surroundings are displayed on the television monitor 2 and projected onto the projection display screen 3.

A control process carried out by the control system 7 including the CPU 17 which is controlled by a combat game program recorded in the recording medium 21 and its control data will be described below with reference to FIGS. 5 through 8.

The control system 7 has various functional means as functions performed thereby. The functional means include a player character control means for controlling the player character on the projection display screen 3 based on control signals from the input unit 5; and a CPU character control means for storing effective combat actions for competitive characters (player characters, CPU characters, or player and CPU characters) in the RAM 13, selecting a plurality of combat actions, depending on a present combat situation, from combat actions corresponding to reference combat situations read from the recording medium 21 and stored in the RAM 13 and also from effective combat actions corresponding to newly recorded combat situations stored in the RAM 13, and controlling the CPU character to perform a combat action chosen from the selected combat actions 3.

The CPU character control means comprises competitive character operation extracting means for extracting operation information of competitive characters up to a time prior to the present time, a situation searching means for searching for situation information which is the same as situation information obtained from the operation information extracted by the competitive character operation extracting means, a combat action information learning means for registering in the RAM 13 a combat action of the extracted operation information corresponding to the situation information searched for by the situation searching means, and combat action information using means for controlling the CPU character to perform a combat action chosen from the combat actions stored in the RAM 13 based on the combat situation.

Specifically, the control system 7 judges a present combat situation, and selects a plurality of combat actions (combat actions in storage tables D shown in FIG. 5) based on the judged present combat situation. The control system 7 selects a plurality of combat actions based on the combat game data including image data, audio data, and combat game program data, which has been recorded in the recording medium 21. The control system 7 then chooses a combat action from the selected combat actions, i.e., combat actions corresponding to the combat situation read from the recording medium 21, combat actions corresponding to the combat situation, recorded in order to newly learn effective combat actions of the player characters as combat actions of the CPU character, and effective combat actions, corresponding to the combat situation, recorded in order to newly edit and learn combat actions of the CPU character that have been made effective because they have been performed successively though they are separate from each other. For controlling the CPU character to perform the chosen combat action, the CPU 17 controls the signal processor 15 to calculate positions of competitive characters based on the combat game data including image data, audio data, and combat game program data, which has been recorded in the recording medium 21, and controls the image processor 16 to write image data and audio data into the RAM 13 based on the calculated results from the signal processor 15. The image data thus written in the RAM 13 is displayed on the television monitor 2 and projected onto the projection display screen 3.

Figure 5:
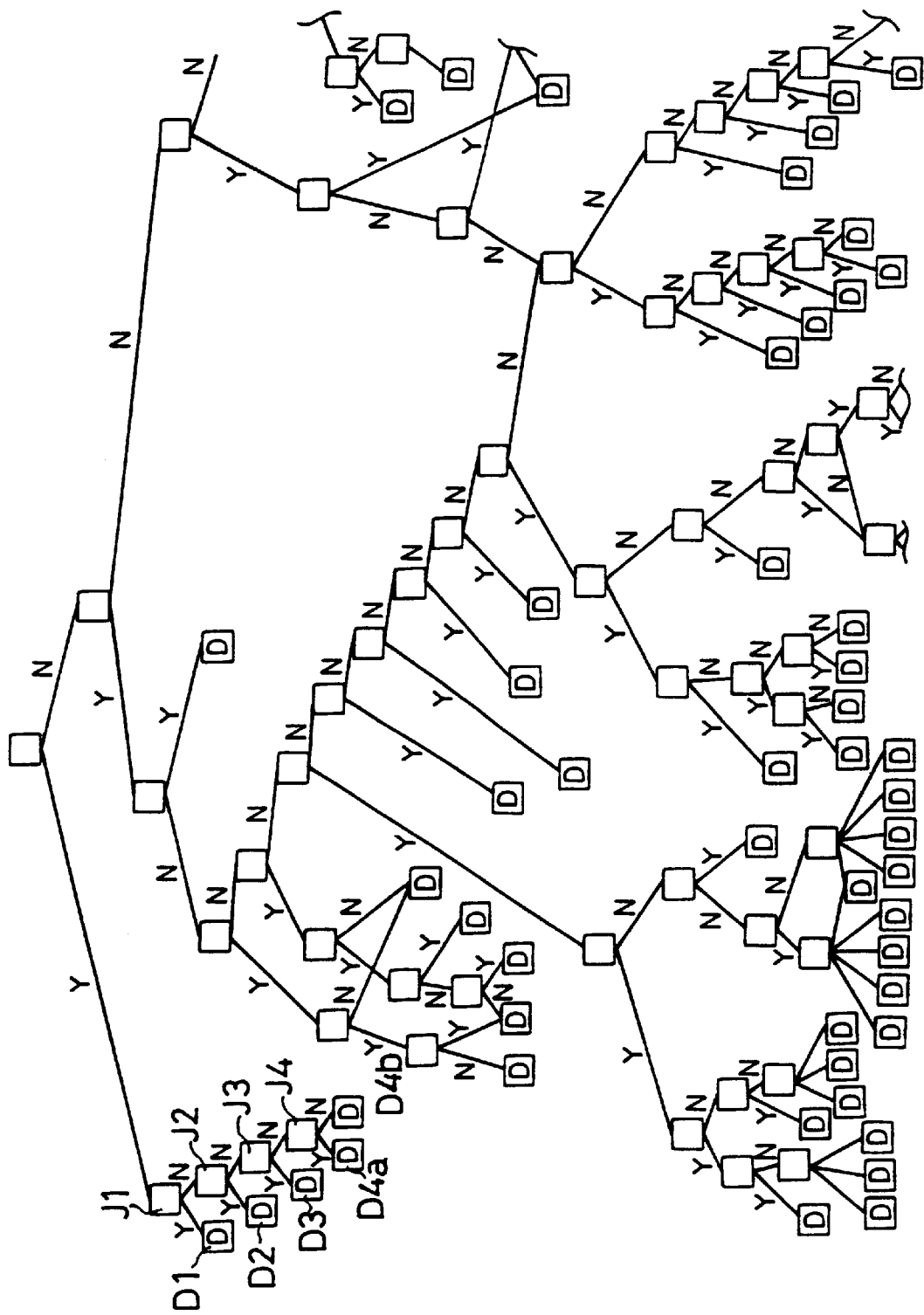
FIG. 5 is a fragmentary diagram of a tree structure of combat situation decision elements for judging combat situations to reach combat actions stored in storage tables.

FIG. 5 fragmentarily shows a tree structure of combat situation decision elements that determined a combat situation to reach combat actions stored in storage tables D in the RAM 13. FIG. 6 shows a plurality of combat actions in one of the storage tables D shown in FIG. 5.

In FIG. 5, each storage table D stores a plurality of combat actions corresponding to the combat situation of the CPU character. As described later on with reference to FIG. 6, the combat actions include combat actions, corresponding to on the combat situation read from the recording medium 21; combat actions, corresponding to the combat situation, newly recorded as effective combat actions; and combat actions, corresponding to the combat situation, recorded in order to newly edit and learn combat actions of the CPU character that have been made effective because they have been performed successively though they are separate from each other. The combat situation decision elements are in the form of flags represented by blank squares in FIG. 5 and arranged in an hierarchical system of different stages. In FIG. 5, those combat situation decision elements which are positioned more up-stream in the tree structure decide whether higher-stage combat situations substantially agree conditionally with the present combat situation displayed on the projection display screen 3, and those combat situation decision elements which are positioned more downstream in the tree structure decide whether lower-stage combat situations substantially agree conditionally with the present combat situation displayed on the projection display screen 3. In this manner, various combat situations ranging from those combat situation decision elements which are positioned more upstream in the tree structure to those combat situation decision elements which are positioned more downstream in the tree structure, including those on the ends of the branches, are successively judged and finally narrowed down to a lower-stage combat situation to reach a plurality of combat actions in a storage table D branched from the lower-stage combat situation. In this manner, a plurality of combat actions depending on the present combat situation displayed on the projection display screen 3 can be selected from.

Effective combat actions that are stored in storage tables D depend on the stage in the tree structure. For example, attacking and guarding actions that are not effective at all are eliminated from the lowermost stage. As the game player proceeds with the combat game, the game player goes into successively higher stages, and the ranges of effective combat actions stored at the higher stages require higher manual control levels of the game player. When a game player of a high manual control level plays the combat game, the high manual control level is learned and registered, and will be used by the CPU character in substantially the same combat situation. When a game player of a low manual control level plays the combat game, the low manual control level is learned and registered, and will be used by the CPU character in substantially the same combat situation. Consequently, the combating level of the CPU character is substantially equalized to the manual control level of the game player. Since combating skills of the CPU and player characters are close to each other, the CPU and player characters fight against each other in a thrilling fashion, and the game player finds the combat game highly enjoyable.

Combat actions depending on combat situations newly recorded as effective combat actions are not registered in the initial phase of the combat game. Therefore, reference combat actions for each combat situation are stored beforehand in each of the storage tables D. Alternatively, reference combat actions for each combat situation may be stored in separate storage tables associated with respective combat situations. In this embodiment, combat actions depending on combat situations newly recorded as effective combat actions and reference combat actions for each combat situation are stored in different storage tables.

An example of specific combat situations will be described in detail below. In FIG. 5, when the CPU character attacks the player character, a combat situation decision element J1 decides whether the enemy (the player character) is tottering or not, a combat situation decision element J2, downstream of the combat situation decision element J1, decides whether the enemy (the player character) is being thrown away or not, a combat situation decision element J3, downstream of the combat situation decision element J2, decides whether the enemy (the player character) is being knocked down or not, and a combat situation decision element J4, downstream of the combat situation decision element J3, decides whether the enemy (the player character) is squatting or not.

If the combat situation decision element J1 judges that the player character is tottering in the present combat situation on the projection display screen 3, then control reaches a plurality of combat actions stored in a storage table D1. If the combat situation decision element J1 does not judge that the player character is tottering, then control proceeds to the next combat situation decision element J2. If the combat situation decision element J2 decides that the player character is being thrown away, then control reaches a plurality of combat actions stored in a storage table D2. If the combat situation decision element J2 does not decide that the player character is being thrown away, then control proceeds to the next combat situation decision element J3. If the combat situation decision element J3 decides that the player character is being knocked down, then control reaches a plurality of combat actions stored in a storage table D3. If the combat situation decision element J3 does not decide that the player character is being knocked down, then control proceeds to the next combat situation decision element J4. If the combat situation decision element J4 decides that the player character is squatting, then control reaches a plurality of combat actions stored in a storage table D4a. If the combat situation decision element J4 does not decide that the player character is squatting, then control reaches a plurality of combat actions stored in a storage table D4b. In this manner, a combat action which the CPU character should perform depending on the present combat situation can be selected from a plurality of combat actions stored in a storage table.

A plurality of combat actions stored in a storage table D as shown in FIG. 6 will be described in detail below. In FIG. 6, the storage table D contains CHARACTER representing a character number, SITUATION representing a situation number, pt representing a situation priority, FRM representing the length of a stored sequence (60 frames per sec.), PTS representing an effectiveness point and SEQUENCE representing control information for combat actions. The effectiveness point PTS comprises a numerical value indicative of the effectiveness of an attack, which is determined by multiplying an attack point by a coefficient depending on the combat situation, or a numerical value indicative of a reduction in the physical power of the opponent (the player character), or a numerical value indicative of how the CPU player is advantageous over the player character. The control information SEQUENCE comprises control input details for each frame and represents an attack pattern. Specifically, the control information SEQUENCE is made up of a number representing the direction of movement of the joystick 9 and button names representing whether buttons are turned on or off.

For example, "G", "P", and "K" indicate information for respective combat actions to be performed by the CPU character which correspond to the GUARD button 10, the PUNCH button 11, and the KICK button 12, respectively. "2" indicates information for moving the CPU character in a direction corresponding to the direction F2 (see FIG. 4) of movement of the joystick 9, i.e., for causing the CPU character to squat downwardly in a displayed image shown in FIG. 7. "8" indicates information for moving the CPU character in a direction corresponding to the direction F8 of movement of the joystick 9, i.e., for causing the CPU character to jump upwardly in the displayed image shown in FIG. 7. "6" indicates information for moving the CPU character in a direction corresponding to the direction F6 of movement of the joystick 9, i.e., for causing the CPU character to move to the right in the displayed image shown in FIG. 7. In the displayed image shown in FIG. 7, the player character is performing a swing kick on the CPU character.

Figure 4:
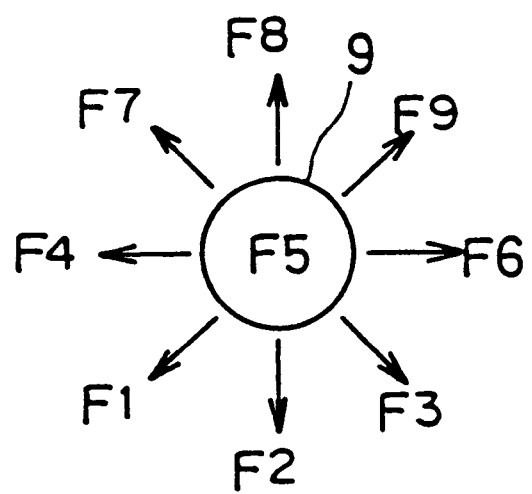
FIG. 4 is a plan view showing directions in which a joystick of the input unit shown in FIG. 3 can be operated.

The dot "." represents the neutral position of the joystick 9, i.e., the direction F5 shown in FIG. 4, when the buttons are pressed. The mark "~" represents a condition in which the joystick 9 is continuously maintained in the neutral position for a given period of time, and the mark "−" represents a condition in which a preceding action or movement continues for a given period of time, and the mark "+" represents a condition in which actions or movements before and after this mark are simultaneously performed. For example, "G+P" indicates that the GUARD button 10 and the PUNCH button 12 are simultaneously pressed to perform a composite throwing action.

The combat action described by the uppermost line in the storage table D shown in FIG. 6 will be described in detail below. FRM (the number of frames) is 66 frames and the length of a sequence is 1.1 sec. and PTS (the effectiveness point) is 37. SEQUENCE (the control information) expressed by way of operations of the input unit 5 is as follows: The GUARD button 10 is continuously pressed for a certain time to guard against attacks. After the GUARD button 10 is released, the joystick 9 is moved twice in the direction F6 to cause the CPU character to dash to the right in FIG. 7, and the PUNCH button 11 is pressed to cause the CPU character to make a punching action. A composite elbow kick may be performed in place of the movement and action represented by "66P". Thereafter, the joystick lever 9 is returned to the neutral position, and the PUNCH button 11 is pressed twice to cause the CPU character to make two successive punching actions to attack the player character. Though the combat action of the CPU character has been described above by way of operations of the input unit 5, these operations of the input unit 5 are given for illustrative purpose only to indicate actions and movements of the CPU character, and the CPU character is actually controlled by the control system 7, but not by the input unit 5.

The combat actions in the storage table D are arranged in a descending order of PTSs (effectiveness points) according to a sorting process, indicating that a combat action selected from this storage table D is more effective in the same combat situation if the number of the combat action is smaller. In this embodiment, a combat action having a greater number, i.e., a combat action having a lower level, is selected in an earlier stage of the combat game, and a combat action having a smaller number, i.e., a combat action having a higher level, is selected as the combat game progresses. When the player character defeats the CPU character three times successively, the combat situation goes up to a next stage, and a combat action having a lower level is selected for the CPU character. Therefore, the combating level of the CPU character is made substantially equivalent to the manual control level of the game player by learning the effective combat action of the player character which is controlled by the game character.

The selection of one of a plurality of combat actions stored in a storage table D varies depending on the reduction in the physical power of the player character and the remaining time of the stage. When the physical power of the player character is reduced, the CPU character can only make an attack of reduced effectiveness, so that the combat game will be performed naturally. When the remaining time of the stage is shorter, a combat action having a higher level is selected for the CPU character.

When the CPU character performs a combat action selected from the combat actions in the storage table D, the present effectiveness point PTS produced as a result of the combat action may become greatly reduced from the previous effectiveness point PTS. If the difference between the present effectiveness point PTS and the previous effectiveness point PTS is greater than a predetermined value, then the present effectiveness point PTS is registered again. If the difference between the present effectiveness point PTS and the previous effectiveness point PTS is greater than the predetermined value, then an effectiveness point PTS which is the average of the previous and present effectiveness points PTS is registered again.

Figure 7:
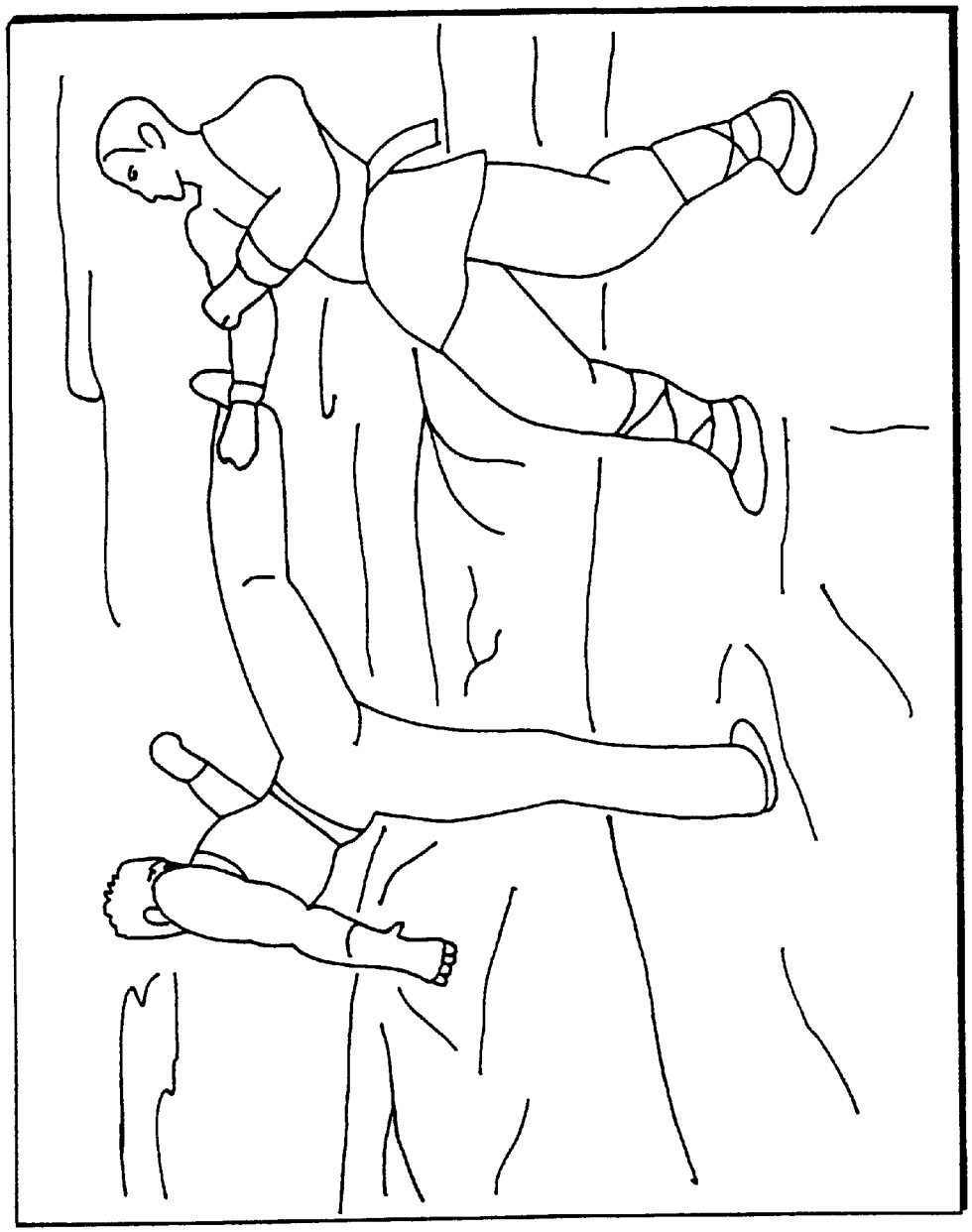
FIG. 7 is a view showing a displayed combat game image in which a player character attacks a CPU character.
Figure 8:
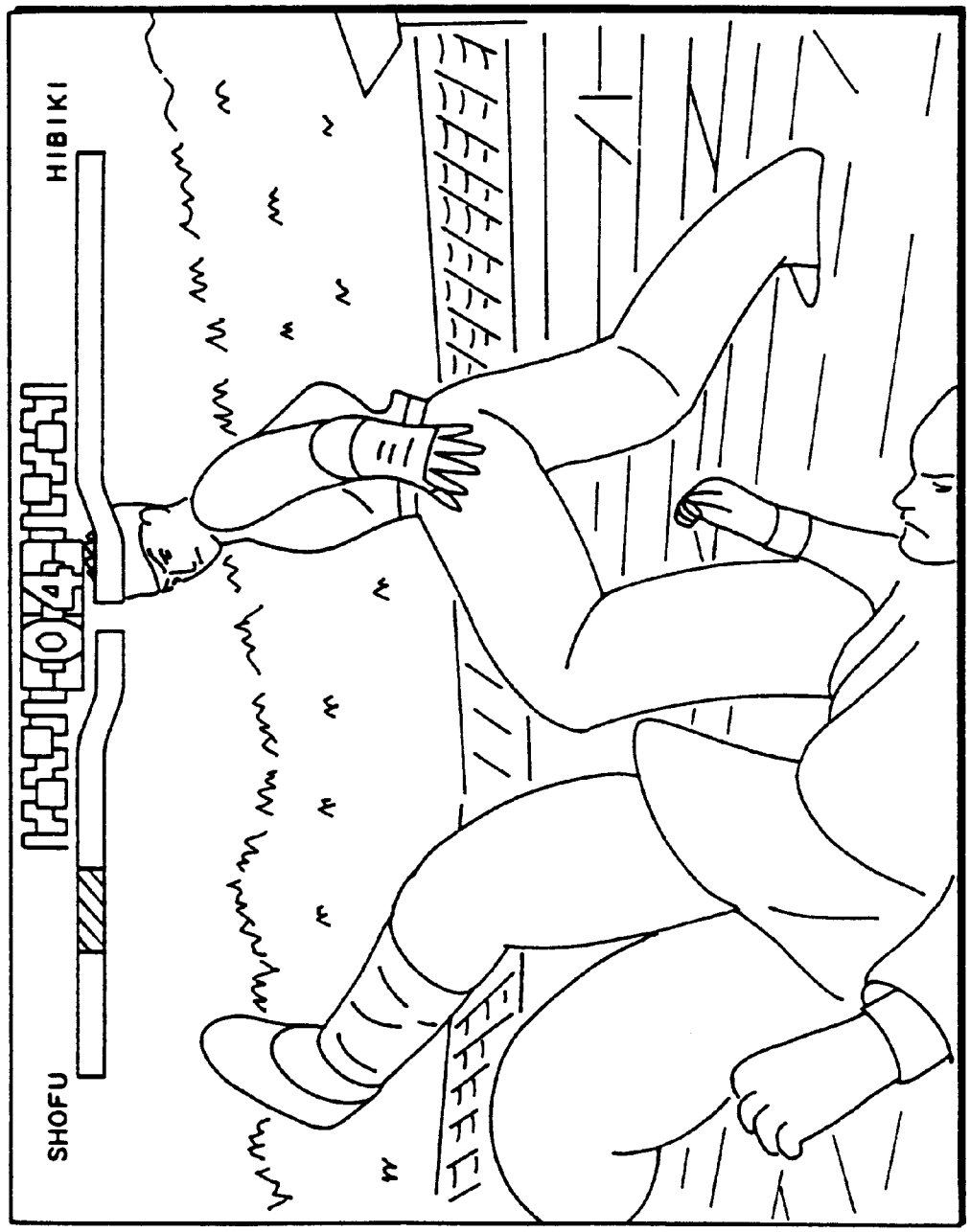
FIG. 8 is a view showing a displayed combat game image in which the player character knocks down the CPU character.

Operation of the competitive video game apparatus shown in FIGS. 1 and 2 will be described below. When a player character attacks a CPU character as shown in FIG. 7 and knocks down the CPU character as shown in FIG. 8, thus damaging the CPU character beyond a certain degree (the hatched area of a bar graph in FIG. 8 represents the physical energy of the CPU character), the CPU character learns the combat action of the player character as an effective combat action, and will use the same combat action when the same combat situation occurs. Such a process will be described below.

Figure 9:
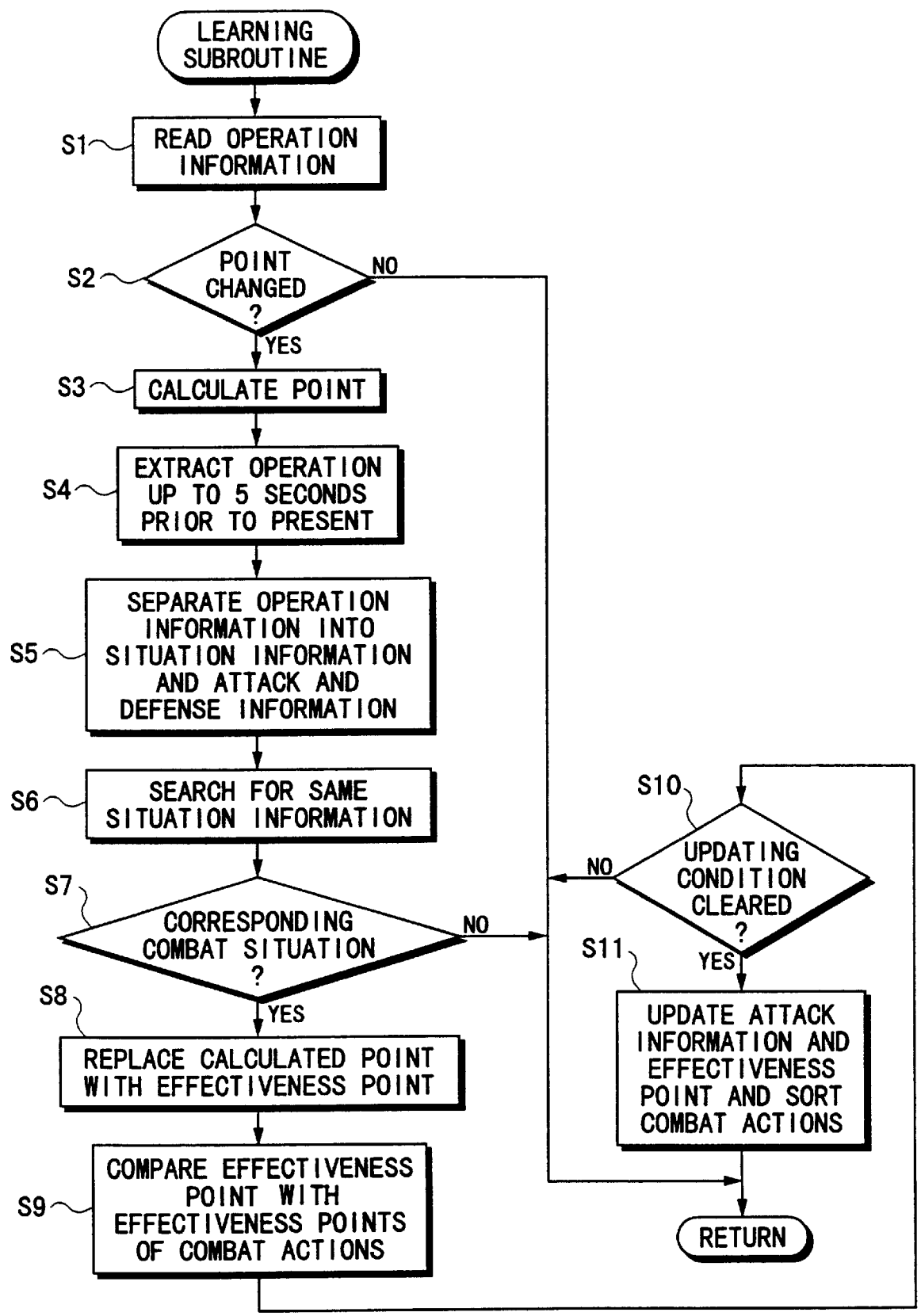
FIG. 9 is a flowchart of a learning subroutine in a game program run by a control system of the competitive video game apparatus shown in FIGS. 1 and 2.

FIG. 9 shows a learning subroutine in the game program run by the control system 7 of the competitive video game apparatus shown in FIGS. 1 and 2. Numerals with a prefix "S" represent step numbers.

As shown in FIG. 9, the control system 7 reads operation information of the player and CPU characters in step S1. Specifically, the control system 7 reads operation information of the player character which is controlled by the game data recorded in the recording medium 21 and data produced by the joystick 9 and the buttons 10, 11, 12 of the input unit 5, and also reads operation information of the CPU character.

The control system 7 decides, with respect to the operation information read in step S1, whether an attack point is changed so as to reduce the physical power of the player character when it is hit by an attack delivered by the CPU character, in step S2. In step S2, the control system 7 is controlled by the game data recorded in the recording medium 21. If the attack point is changed, then the control system 7 calculates the changed attack point in step S3. If the attack point is not changed, then control returns from the learning subroutine to the main routine of the game program.

After step S3, the control system 7 extracts operation information of the player and CPU characters up to a time prior to the present time (5 seconds prior to the present time) in step S4.

Then, the control system 7 separates the operation information extracted in step 4 into combat situation information and combat action information (attack information and defense information) in step S5.

The control system 7 decides the combat situation information separated in step S5 successively against the combat situation decision elements stored in the RAM 13 in step S6 to look for a combat situation which is substantially the same as the separated combat situation information. The control system 7 decides whether there is a corresponding combat situation in step S7. If there is a corresponding combat situation in step S7, then control proceeds to step S8. If there is no corresponding combat situation in step S7, then control returns from the learning subroutine to the main routine of the game program.

In step S8, the control system 7 replaces the attack point calculated in step S8 with an effectiveness count. For example, if a new attack point is generated in a predetermined time after the attack point calculated in step S8, then these new attack points are added into a sum attack point, and the sum attack point is multiplied by a coefficient depending on the combat situation, thus calculating an effectiveness count. A value corresponding to the reduction in the physical power of the player character or a value corresponding to the advantage of the CPU character may be used as an effectiveness count.

In next step S9, the control system compares the effectiveness count produced in step S8 with effectiveness counts of a plurality of combat actions in the storage table corresponding to the combat situation information. The control system decides in step S10 whether the effectiveness count produced in step S8 is greater than a minimum effectiveness count in the storage table. The minimum effectiveness count serves as an updating condition and is established in each of the stages of the tree structure shown in FIG. 5.

If the effectiveness count produced in step S8 is greater than the minimum effectiveness count (updating condition), then the control system 7 registers the combat action information composed of the attack information and the defense information as effective combat action information, and sorts combat actions in a descending order of effectiveness points for thereby registering effective combat actions of the player character in the RAM 13. Effective combat actions up to a certain level are newly registered in the RAM 13. When more effective combat actions are to be registered, less effective combat actions are deleted from the RAM 13. Therefore, combat actions of higher levels are newly registered at all times in the RAM 13.

Figure 10:
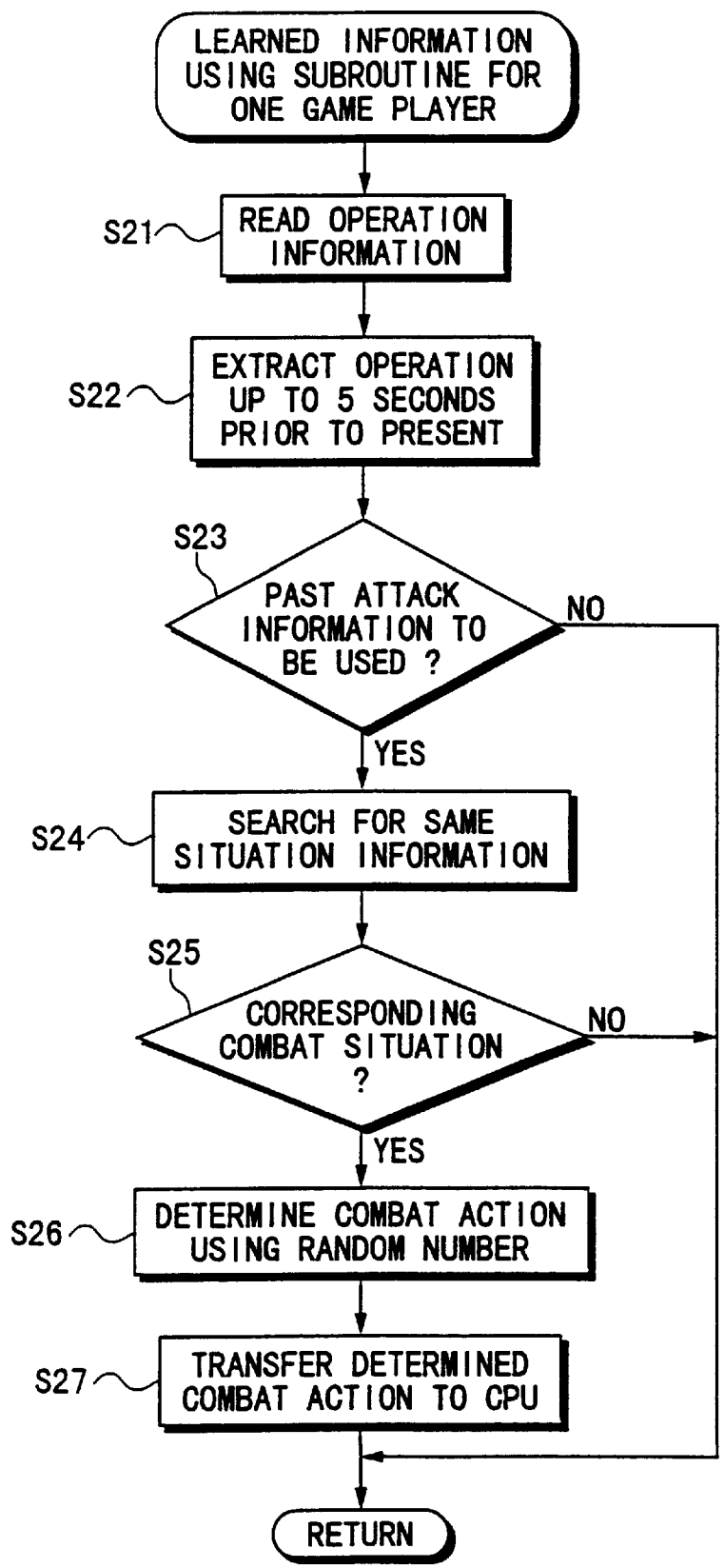
FIG. 10 is a flowchart of a learned information using subroutine in the game program run by the control system of the competitive video game apparatus shown in FIGS. 1 and 2.

FIG. 10 shows a learned information using subroutine in the game program run by the control system 7.

As shown in FIG. 10, the control system 7 reads operation information of the player and CPU characters in step S21 at present. Then, the control system 7 extracts, in step S22, combat situation information of the player and CPU characters up to a time prior to the present time (5 seconds prior to the present time) from the operation information read in step S21.

The control system 7 decides in step S23 whether the past attack information which has been registered as the combat operation information depending on the combat situation in the RAM 13 according to the learning subroutine shown in FIG. 9, is to be used or not. If the past attack information is not to be used, but basic combat operation information depending on combat situations read from the recording medium 21 is to be used, then control returns from the learned information using subroutine to the main routine of the game program.

If the past attack information is to be used in step S23, then the control system 7 decides the combat situation information successively against the combat situation decision elements stored in the RAM 13 in step S24 to look for a combat situation which is substantially the same as the separated combat situation information. The control system 7 decides whether there is a corresponding combat situation in step S25. If there is no corresponding combat situation in step S25, then control returns from the learned information using subroutine to the main routine of the game program. If there is a corresponding combat situation in step S25, then control proceeds to step S26. In step S26, the control system 7 determines a combat action from the combat actions stored in the corresponding storage table, using a random number or the like.

The determined combat action is then transferred to the CPU 17 in step S27.

As described above, the control system 7 registered effective combat actions of the player character in the RAM 13 to learn the effective combat actions of the player character, and also selects one of the registered combat actions depending on the combat situation and controls the CPU character to deliver the selected combat action on the projection display screen 3. Therefore, the CPU character learns the combat action information of the manual control level of the game player, and uses the learned combat action information. Therefore, the combating level of the CPU character is made substantially equal to the manual control level of the game player, and the game player can enjoy the combat game because the combating levels of the player and CPU characters are close to other and the player and CPU characters fight against each other in a thrilling manner. Since the CPU character learns a wide variety of unexpected attacking and guarding actions from various game players in the past and also learns the combat action information of the manual control level of the game player who is presently playing the combat game, the CPU character can deliver new combat actions at all times, and the game player can enjoy the combat game without getting bored. The competitive video game system according to the present invention is thus capable of satisfying the game player, and will provide sufficiently high profitability per time because the combat game will not be continued too long.

The competitive video game system according to the present invention may be in the form of an arcade game machine, a home game machine, or a general personal computer. If the competitive video game system is in the form of an arcade game machine, then the input unit 5 has the analog joystick 11 and various switches, and the image display unit 4 has the television monitor 2 such as a dedicated CRT or liquid display unit and the projection display screen 3. If the competitive video game system is in the form of a home game machine, then the input unit 5 comprises a so-called controller having a cross key and various control buttons, and the control system 7 is incorporated in the home game machine, with a television set used as the image display unit 4. If the competitive video game system is in the form of a personal computer, then the input unit 5 comprises a keyboard and a mouse, and the image display unit 4 comprises a graphic display unit, with the control system 7 being incorporated in the personal computer.

If the competitive video game system is in the form of a home game machine or a personal computer, then the game program is stored in a computer-readable game program storage medium such as a floppy disk, a CD-ROM, a magnetooptical disk, a DVD-ROM, or the like, can be read into the home game machine or the personal computer by a reader.

According to the present invention, inasmuch as the CPU character learns the combat action information of the manual control level of the game player, and uses the learned combat action information, the combating level of the CPU character is made substantially equal to the manual control level of the game player, and the game player can enjoy the combat game because the combating levels of the player and CPU characters are close to each other and the player and CPU characters fight against each other in a thrilling manner.

Furthermore, since the CPU character learns a wide variety of unexpected attacking and guarding actions from various game players in the past and also learns the combat action information of the manual control level of the game player who is presently playing the combat game, the CPU character can deliver new combat actions at all times, and the game player can enjoy the combat game without getting bored.

In addition, because the CPU character imitates combat actions of the player depending on the combat situation, the CPU character can fight in human-like behaviors, which will make the game player enjoy the combat game much more.

Although a certain preferred embodiment of the present invention has been shown and described in detail, it should be understood that various changes and modifications may be made therein without departing from the scope of the appended claims.

What is claimed is:

1. A video game apparatus for playing a competitive video game on a display screen for a competitive match between competitive characters which include at least a player character and a CPU character, comprising:

controller means for generating control commands for combat actions of the player character based on manual input from a player;

storage means for storing combat actions for the CPU character in correspondence with combat situations;

player character control means for controlling the player character on the display screen, in response to the control commands from said controller means, to execute the combat actions; and CPU character control means for registering combat actions of the player character, which are effective, in said storage means in correspondence with a combat situation, and controlling the CPU character to perform in accordance with one of the combat actions registered in said storage means, said one of the combat actions being selected based on a present combat situation of the player character and the CPU character.

2. A video game apparatus according to claim 1, wherein said CPU character control means comprises:

player character operation extracting means for extracting operation information of the player character up to a time prior to a present time and separating situation information and combat action information including a combat action from the operation information;

situation information searching means for locating in the storage means a same situation information as the situation information of said extracted operation;

combat action information learning means for registering, in said storage means, the combat action information, of the extracted operation, in correspondence with the same situation information located by said situation information searching means; and combat action information using means for selecting one of the combat actions registered in said storage means in correspondence with a combat situation corresponding to the present combat situation of the player character and the CPU character, and controlling said CPU character to perform said one of the combat actions.

3. A method of playing a competitive video game on a display screen for a competitive match between competitive characters which include at least a player character and a CPU character, comprising the steps of:

registering combat actions of the player character, which are effective, in correspondence with a combat situation; and controlling the CPU character to perform in accordance with one of the registered combat actions, said one of the combat actions being selected based on a present combat situation of the player character and the CPU character.

4. A method according to claim 3, wherein said step of controlling the CPU character comprises the steps of:

extracting operation information of the player character up to a time prior to a present time and separating situation information and combat action information including a combat action from the operation information;

searching for the same situation information as situation information obtained from said operation which has been extracted;

locating a same situation information as the situation information of said extracted operation;

registering the combat action information, of the extracted operation, in correspondence with the same situation information which is located; and selecting one of the combat actions registered in correspondence with a combat situation corresponding to the present combat situation of the player character and the CPU character, and controlling said CPU character to perform said one of the combat actions.

5. A computer-readable recording medium storing an executable control program for playing a competitive video game on a display screen for a competitive match between competitive characters which include at least a player character and a CPU character, said control program comprising the steps of:

registering combat actions of the player character, which are effective, in correspondence with a combat situation; and controlling the CPU character to perform in accordance with one of the registered combat actions, said one of the combat actions being selected based on a present combat situation of the player character and the CPU character.

6. A computer-readable recording medium according to claim 5, wherein said step of controlling the CPU character comprises the steps of:

extracting operation information of the player character up to a time prior to a present time and separating situation information and combat action information including a combat action from the operation information;

searching for the same situation information as situation information obtained from said operation which has been extracted;

locating a same situation information as the situation information of said extracted operation;

registering the combat action information, of the extracted operation, in correspondence with the same situation information which is located; and selecting one of the combat actions registered in correspondence with a combat situation corresponding to the present combat situation of the player character and the CPU character and controlling said CPU character to perform said one of the combat actions.

* * * * *